Patented Nov. 21, 1922.

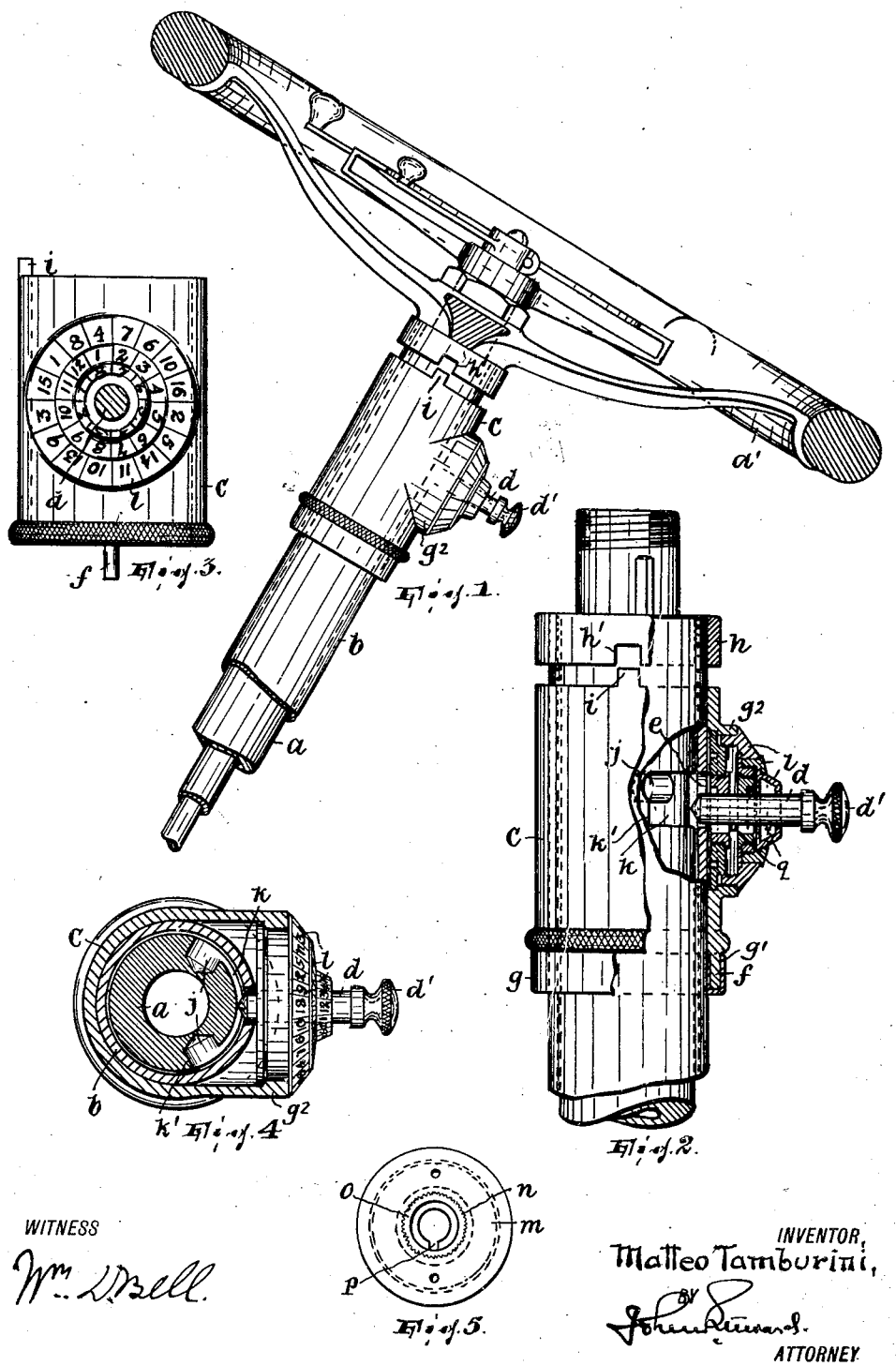

1,436,416

UNITED STATES PATENT OFFICE.

MATTEO TAMBURINI, OF PATERSON, NEW JERSEY.

VEHICLE STEERING LOCK.

Application filed August 13, 1921. Serial No. 491,996.

*To all whom it may concern:*

Be it known that I, MATTEO TAMBURINI, a subject of the King of Italy, residing at Paterson, in the county of Passaic and State of New Jersey, have invented certain new and useful Improvements in Vehicle Steering Locks, of which the following is a specification.

This invention relates to means for locking the steering wheels of automobiles, and it has for its object to provide a locking means whereby the steering wheels may be securely held "cramped", that is, turned to their limit, either one way or the other, said means being so constructed that when it is not in use it will not be likely to interfere with the turning of the wheels. In carrying out my invention I provide a tubular sliding member on the tubular upright in which the steering post of an automobile is usually arranged and in this sliding member I provide a radially movable pin adapted to engage in suitable radial holes in the steering post when the sliding member is at one of its limits of sliding movement, it being understood that when the sliding member is at the other of its said limits the bolt is not in a position to enter either of the holes; and in order to assist the operator in effecting the interlock between the bolt and one of the holes I provide in a novel way for detecting the proper position of such hole with respect to the bolt.

In the drawing,

Figure 1 is a side elevation of the steering means of an automobile provided with my improved lock;

Figure 2 shows the steering post, the tubular upright in which it turns and the locking means partly in side elevation and partly in section;

Figure 3 is a front elevation, partly in section, of the tubular member of the locking means;

Figure 4 is a horizontal sectional view of the parts shown in Figure 2; and

Figure 5 is an elevation of one of the tumblers of the locking means.

$a$ is a steering post carrying the steering wheel $a'$ and as a part of the steering mechanism being assumed to be capable of turning to a definite limit in each direction, that is, by the steering mechanism being positively stopped in some way when such limit is reached.

$b$ is the tubular upright in which as usual the steering post is arranged.

$c$ is a sleeve constituting the aforesaid tubular member, it being telescoped over the upright $b$. By mechanism which I shall describe later this sleeve carries a bolt $d$ having a knurled head $d'$ and arranged radially of the parts $a$, $b$, $c$, $e$ being a vertical slot in part $b$ receiving the inner end of the bolt, which is capable of turning on its own axis and also of movement radially inward from the position shown in Figure 2. The sleeve $c$ is in effect splined to the upright $b$ in this way: it has a stud $f$ projecting from one end thereof and entering a hole $g'$ in a collar $g$ brazed or otherwise rigidly secured on the upright. The limit of upward movement of the sleeve is afforded by another collar $h$ which is brazed or otherwise secured on the upright and may have a recess $h'$ to receive a tongue $i$ on the sleeve, the elements $h'$ $i$ being in effect the same as the elements $f$ $g'$. The wall of the upright $b$ is usually too thin to permit the use of a feather and groove after the manner of the ordinary spline, which is why I employ a spline connection of the character of that indicated at $f$ $g'$ and $h'$ $i$.

The steering post has two radial holes $j$ each arranged so that when the steering mechanism including the steering post is moved to either of its limits such hole will be in the same vertical plane as that in which the bolt $d$ is arranged, the side of each hole which adjoins the other forming a relatively laterally facing locking shoulder. These holes are formed at the ends of an arcuate groove $k$ which is formed in and around the steering post horizontally, its said ends being substantially coincident with the right side of the right-hand hole and the left side of the left-hand hole; the depth or the width of the groove is greater than the diameter of the holes (which are in the same horizontal plane with each other), that is to say, it extends from a plane coincident with the tops of the holes to a plane more or less below the bottoms of the holes. It may be remarked that the collars $g$ $h$ are so positioned on the upright $b$ that the movement of the sleeve from one to the other is equal to the excess of width of the groove over that of the holes.

In the unlocked position of the steering mechanism the bolt stands as in Figures 2 and 4 and the sleeve $c$ is depressed, resting against the collar $g$, being held in that position by gravity. In this position, the steering post is free to turn, and even if the bolt be pressed in it would only bear against the smooth unshouldered surface of the groove which is below the portion thereof in which the holes $j$ and their mentioned locking shoulders are formed. In order to lock the steering post, the vehicle being at standstill, the steering mechanism is manipulated so that the steering post stands turned or "cramped" to either one or the other of its limits of movement; whether or not, on account of possible lost-motion in the steering mechanism as a whole, the said mechanism will be actually at said limit at this time, the steering post will have its movement limited, or at least will be brought to engage the bolt of the locking member $d$, by one of the stop shoulders $k'$ at the end of the groove $k$ impinging against the bolt, so that the operator, especially if he has his hand on the bolt, will detect that the aforementioned locking shoulders of the corresponding locking hole $j$ are in position to be engaged by the bolt. If he then raises the carrier for the locking mechanism which the sleeve $c$ constitutes until the bolt impinges against the top of the groove the bolt may be entered into said hole.

The bolt or locking member $d$ is supported and controlled as to its longitudinal movement by a combination lock mechanism, including a system of rotary dial members $l$, in which the bolt is journaled and in which the outermost member is journaled in a boss $q^2$ projecting from the sleeve or carrier $c$. This combination lock mechanism is substantially the same as that shown in my Patent No. 1,076,171, excepting that for the purpose of rendering the combination alterable at will, one or more of the members may be formed with an outer part $m$ having a toothed bore $n$ and an inner part or bushing $o$ having a toothed periphery to engage said bore, the bushing having the notch $p$ which enables one of the wards or pins $q$ of the bolt to pass the bushing when the bolt is moved longitudinally (see Figure 5).

Having thus fully described my invention, what I claim as new and desire to secure by Letters Patent is:—

In combination, a vehicle steering post, a tubular fixed upright enclosing the post, a carrier device having limited up and down movement but confined against rotary movement relatively to the upright, and a locking member movable in said carrier device substantially radially of the post, said upright having an up-and-down-extending opening receiving said member and permitting free up and down movement of the latter with the carrier device and the post having enclosed by the upright and in a transverse plane registering with said member when the carrier device is at one limit of its movement a relatively lateral locking shoulder to be engaged by said member when the latter is moved radially inward and also having in a transverse plane registering with said member when the carrier is at the other of its limits of movement a smooth surface preventing radially inward movement of said member.

In testimony whereof I affix my signature.

MATTEO TAMBURINI.